July 4, 1961
H. WEINSTEIN
2,991,347
MAGNETIC JIG FOR ALLOYING
Filed Dec. 14, 1959
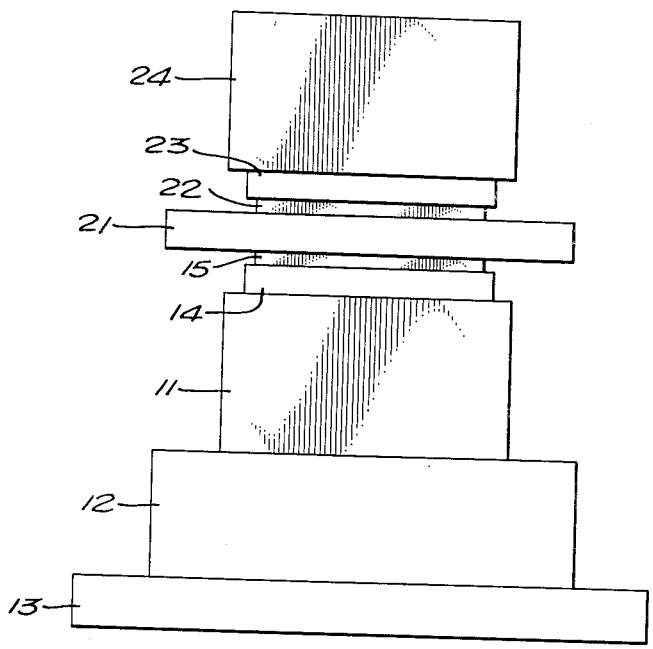
INVENTOR.
HAROLD WEINSTEIN
BY
ATTORNEY Patented July 4, 1961

2,991,347
MAGNETIC JIG FOR ALLOYING

Harold Weinstein, La Habra, Calif., assignor to Hoffman Electronics Corporation, a corporation of California
Filed Dec. 14, 1959, Ser. No. 859,353
9 Claims. (Cl. 219—85)

The present invention relates to jigs, and more particularly to jigs using magnets to restrain the object being held in position.

Wide-spread interest during recent years in the manufacture of semiconductor devices has given rise to the development of many new manufacturing processes which have been made necessary because of the unusual characteristics inherent in semiconductor materials. One difficult area has been the obtaining of a satisfactory alloy bond between a semiconductor and a metal.

Soldering and alloying operations used in the fabrication of semiconductor devices require different amounts of pressure during the different heating stages involved. To properly obtain a solder alloy bonding of a molybdenum disc to a silicon junction wafer, for example, high pressure is needed during the initial heating stages to improve heat transfer and to help force out entrapped air and fill up all the spaces with solder. As the temperature rises and the solder melts, the pressure should be decreased to assure no excess outward flow of solder, which could cause a poor bond.

It is an object of the present invention, therefore, to provide a novel magnetic jig.

It is another object of the present invention to provide a magnetic jig capable of automatically varying the pressure that it exerts upon an object being held, in accordance with the temperature of the object.

According to one embodiment of the present invention, a magnetic jig comprises a pair of magnets for holding an object therebetween. The magnets are constructed so that the strength of their magnetic attraction is proportional to their temperature. When cool, the magnets attract each other with a force sufficient to restrain the object in place. As the object and the magnets are heated, the attractive force decreases, until at a predetermined temperature the magnetic attraction has decreased to a predetermined value.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a side view of a magnetic jig according to the present invention.

Referring now to the drawing, the sole figure shows magnet 11 resting upon iron support plate 12, which is in contact with electric heater 13. Gold-plated molybdenum disc 14, solder preform 15, gold-plated diffused-junction silicon wafer 21, solder preform 22, gold-plated molybdenum disc 23, and magnet 24 are placed upon magnet 11 in that order.

Magnets 11 and 24 are permanent magnets made of a material having a remanence that is temperature dependent, remanence being the magnetic flux density remaining in a substance after the magnetizing force has been removed. The remanence of a permanent magnet normally is inversely proportional to the absolute temperature of the magnet and becomes zero at a temperature called the Curie point. Alnico V is a very suitable material for magnets 11 and 24.

At room temperature magnets 11 and 24 are strongly attracted together and hold silicon wafer 21, molybdenum discs 14 and 23, and solder preforms 15 and 22 securely in place. During the initial heating stage, as heater 13 gradually reaches operating temperature, magnets 11 and 24 exert just enough pressure to improve heat transfer and to help force out the air trapped between the wafer, discs and preforms. As the temperature rises to about 200° C. and solder preforms 15 and 22 start to melt, the attractive force between magnets 11 and 24 gradually decreases, but remains strong enough to fill up all the spaces with solder. When the temperature reaches about 450° C., the Curie point will have been passed. The loss of attractive force between magnets 11 and 24 is desirable to avoid squeezing out the molten solder, which could cause a poor bond. Squeezed out solder would also tend to flow toward the edge of silicon wafer 21, shorting out any junctions.

Graphs showing the relative non-reversible and reversible variations of the remanence of various magnetic materials with respect to temperature are readily available in the literature and can be used to help choose the permanent magnet desired for any specific application. For the present application it has been found that Indox magnets are preferred for low temperature eutectic systems melting at about 200° C., and Alnico V magnets are preferred for higher temperature eutectic systems melting at about 360° C.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A magnetic jig for soldering and alloying operations used in the fabrication of semiconductor devices, comprising: first and second permanent magnets capable of supporting therebetween a semiconductor and an alloyable material separated by a solder preform; and pressing them together; and in combination therewith a heater for heating said semiconductor, material, preform and magnets, said magnets having a remanence that is inversely related to their temperature.

2. A magnetic jig for soldering operations used in the fabrication of semiconductor devices, comprising: first and second permanent magnets capable of supporting therebetween a semiconductor and a solderable material separated by solder and pressing them together, at least one of said magnets having a remanence that is inversely related to its temperature; and in combination therewith a heater for heating said semiconductor, material, solder, and magnet having a variable remanence.

3. A magnetic jig comprising first and second permanent magnets separated by an object held therebetween, and in combination therewith a heater for heating said object and said magnets, said magnets being vertically mountable with respect to each other and at least one of said magnets having a remanence that is inversely related to its temperature.

4. A magnetic jig comprising a first permanent magnet for supporting an object placed thereupon; a second permanent magnet mountable on top of said object for applying pressure thereto, at least one of said magnets having a remanence that is inversely proportional to its temperature; and in combination therewith a heater for heating said at least one magnet.

5. A magnetic jig comprising first and second permanent magnets, at least one of said magnets having a remanence that is inversely related to its temperature, and said magnets being adapted to restrain in position an object placed therebetween; and in combination therewith a heater for heating said at least one magnet.

6. A method of producing a solder alloy bond to a semiconductor, comprising the steps of: placing a silicon semiconductor wafer, a solder preform, and a molybdenum disc between first and second Alnico V permanent magnets in vertical alignment; and heating said magnets and said wafer, preform, and disc to approximately 450° centigrade.

7. A method of producing a solder alloy bond to a semiconductor device, comprising the steps of: placing said semiconductor, solder, and an alloyable material in vertical alignment between first and second permanent magnets having a remanence that is inversely related to their temperature; and heating said magnets and said semiconductor, solder, and alloyable material at least until the Curie point is reached.

8. A method of producing a solder alloy bond to a semiconductor device, comprising the steps of: placing said semiconductor, solder, and solderable material in the magnetic field of a permanent magnet having a remanence that is inversely related to its temperature; and heating said magnet and said semiconductor, solder, and solderable material until the magnetic attraction has decreased to a predetermined value.

9. A method of soldering comprising the steps of: placing solder and the materials to be soldered together in the magnetic field of a permanent magnet having a remanence that is inversely related to its temperature; and heating said magnet, materials, and solder until the magnetic attraction has decreased to a predetermined value.

References Cited in the file of this patent

UNITED STATES PATENTS

| | | |
|---|---|---|
| 1,030,641 | Braden | June 25, 1912 |
| 1,343,346 | Buckley | June 15, 1920 |
| 2,866,889 | Dempsey | Dec. 30, 1958 |

FOREIGN PATENTS

| | | |
|---|---|---|
| 118,265 | Switzerland | Mar. 11, 1926 |